United States Patent
Bartoli et al.

(10) Patent No.: US 10,421,605 B2
(45) Date of Patent: Sep. 24, 2019

(54) CAPSULE FOR BEVERAGES

(71) Applicant: SARONG SOCIETA' PER AZIONI, Reggiolo (Reggio Emilia) (IT)

(72) Inventors: Andrea Bartoli, Reggio Emilia (IT); Davide Capitini, Reggio Emilia (IT); Mattia Solieri, Cavezzo (IT)

(73) Assignee: SARONG SOCIETA' PER AZIONI, Reggiolo (IT)

( * ) Notice: Subject to any disclaimer, the term of this patent is extended or adjusted under 35 U.S.C. 154(b) by 0 days.

(21) Appl. No.: 15/774,789

(22) PCT Filed: Nov. 9, 2016

(86) PCT No.: PCT/IB2016/056742
§ 371 (c)(1),
(2) Date: May 9, 2018

(87) PCT Pub. No.: WO2017/081622
PCT Pub. Date: May 18, 2017

(65) Prior Publication Data
US 2018/0327178 A1    Nov. 15, 2018

(30) Foreign Application Priority Data
Nov. 9, 2015  (IT) .................. 102015000070588

(51) Int. Cl.
*B65D 85/804* (2006.01)
*A47J 31/06* (2006.01)
*A47J 31/36* (2006.01)

(52) U.S. Cl.
CPC ....... *B65D 85/8043* (2013.01); *A47J 31/0668* (2013.01); *A47J 31/3623* (2013.01)

(58) Field of Classification Search
CPC .... A47J 31/42; A47J 31/0668; A47J 31/3623; B65D 85/8043
(Continued)

(56) References Cited

U.S. PATENT DOCUMENTS 2,968,560 A * 1/1961 Goros .................... A23F 5/267
426/115
4,136,202 A * 1/1979 Favre ................. B65D 85/8043
426/77
(Continued)

FOREIGN PATENT DOCUMENTS

IT    2014MO000062    3/2014
WO    03059778 A2     7/2003
(Continued)

OTHER PUBLICATIONS

International Search Report and Written Opinion of the International Searching Authority Application No. PCT/IB2016/056742 Completed: Feb. 15, 2017; dated Feb. 24, 2017 12 Pages.

*Primary Examiner* — Jimmy Chou
(74) *Attorney, Agent, or Firm* — Whitmyer IP Group LLC

(57) ABSTRACT

A capsule for preparing a beverage includes a capsule body made by forming a sheet of thermoformable plastic material, the capsule body having: a base wall and a first portion of side wall defining a cavity suitable for containing an initial product to be combined with a fluid to obtain a final product in the form of a beverage, a first opening of the cavity opposite the base wall, an upper edge extending from the first portion of side wall and surrounding the first opening, a second opening of the cavity made in the base wall, in which the first opening is closed hermetically by a covering element fixed to the edge, the covering element being perforable by a dispensing machine in which the capsule is usable, in which the second opening is closed hermetically by a closing element that is suitable for tearing when pressure inside the cavity exceeds a preset value, the capsule further comprising a chamber located opposite the base wall with respect to the cavity and defined by a second portion of side wall and by a bottom wall of the body of the capsule, the chamber being able to communicate with the cavity (Continued)

through the second opening, when the closing element tears, the chamber being provided with a third opening, made in the center of the bottom wall, inside the chamber there being arranged a damping element for controlling the exit speed of the beverage, the damping element is configured in such a way as to move inside the chamber between an initial position and a final position, through the effect of the pressure of the beverage in the chamber.

25 Claims, 11 Drawing Sheets

(58) Field of Classification Search
USPC ........ 426/77, 78, 79, 112, 433, 115; 99/286, 99/289 R, 295, 302 R, 307, 323
See application file for complete search history.

(56) References Cited

U.S. PATENT DOCUMENTS

| | | | | |
|---|---|---|---|---|
| 4,846,052 | A * | 7/1989 | Favre | A47J 31/3695 99/295 |
| 5,325,765 | A * | 7/1994 | Sylvan | A47J 31/0673 426/433 |
| 5,327,815 | A * | 7/1994 | Fond | A47J 31/0668 99/295 |
| 5,398,595 | A * | 3/1995 | Fond | A47J 31/0668 99/295 |
| 5,402,707 | A * | 4/1995 | Fond | A47J 31/0678 99/295 |
| 5,649,472 | A * | 7/1997 | Fond | A47J 31/0673 426/433 |
| 5,762,987 | A * | 6/1998 | Fond | A47J 31/0673 426/433 |
| 5,826,492 | A * | 10/1998 | Fond | A47J 31/0673 99/295 |
| 5,897,899 | A * | 4/1999 | Fond | A47J 31/0678 426/112 |
| 6,079,315 | A * | 6/2000 | Beaulieu | A47J 31/3628 99/289 R |
| 6,182,554 | B1 * | 2/2001 | Beaulieu | A47J 31/3628 99/289 R |
| 6,644,173 | B2 * | 11/2003 | Lazaris | A47J 31/3628 99/295 |
| 7,279,188 | B2 * | 10/2007 | Arrick | B65D 85/8043 426/112 |
| 7,490,542 | B2 * | 2/2009 | Macchi | A47J 31/3695 426/433 |
| 7,552,672 | B2 * | 6/2009 | Schmed | B65D 85/8043 426/115 |
| 7,604,826 | B2 * | 10/2009 | Denisart | B65D 85/8043 426/112 |
| 7,624,673 | B2 * | 12/2009 | Zanetti | B65D 85/8043 99/295 |
| 7,703,381 | B2 * | 4/2010 | Liverani | B65D 85/8043 99/295 |
| 7,815,953 | B2 * | 10/2010 | Mastropasqua | B65D 85/8043 426/433 |
| 7,836,819 | B2 * | 11/2010 | Suggi Liverani | A47J 31/0668 426/82 |
| 7,854,192 | B2 * | 12/2010 | Denisart | A47J 31/3695 99/295 |
| 7,856,920 | B2 * | 12/2010 | Schmed | A47J 31/0673 99/295 |
| 7,856,921 | B2 * | 12/2010 | Arrick | B65D 85/8043 426/112 |
| 7,930,972 | B2 * | 4/2011 | Denisart | A47J 31/002 99/295 |
| 7,946,217 | B2 * | 5/2011 | Favre | A47J 31/0668 99/295 |
| 7,993,691 | B2 * | 8/2011 | Yoakim | B65D 85/8043 426/77 |
| 8,147,887 | B2 * | 4/2012 | Dogan | B65D 85/8043 426/77 |
| 8,161,866 | B2 * | 4/2012 | Kollep | B65D 85/8043 99/279 |
| 8,161,868 | B2 * | 4/2012 | Bolzicco | B65D 85/8043 210/484 |
| 8,202,560 | B2 * | 6/2012 | Yoakim | B65D 85/8043 426/431 |
| 8,220,382 | B2 * | 7/2012 | Verbeek | A47J 31/405 426/115 |
| 8,304,006 | B2 * | 11/2012 | Yoakim | A47J 31/0678 426/112 |
| 8,322,271 | B2 * | 12/2012 | Glucksman | B65D 85/8043 99/282 |
| 8,640,604 | B2 * | 2/2014 | Doglioni Majer | B65D 85/8043 426/77 |
| 2006/0019000 | A1 * | 1/2006 | Zanetti | B65D 85/8043 426/112 |
| 2006/0110507 | A1 * | 5/2006 | Yoakim | B65D 85/8043 426/433 |
| 2007/0068395 | A1 * | 3/2007 | Masek | B65D 85/8043 99/295 |
| 2007/0084352 | A1 * | 4/2007 | Yuen | A47J 31/0631 99/295 |
| 2007/0144355 | A1 * | 6/2007 | Denisart | A47J 31/3695 99/275 |
| 2007/0186784 | A1 * | 8/2007 | Liverani | A47J 31/0668 99/295 |
| 2007/0224319 | A1 * | 9/2007 | Yoakim | B65D 85/8043 426/433 |
| 2008/0105131 | A1 * | 5/2008 | Castellani | A47J 31/0673 99/295 |
| 2008/0216666 | A1 * | 9/2008 | Doglioni Majer | A47J 31/0673 99/295 |
| 2008/0245236 | A1 * | 10/2008 | Ternite | A47J 31/0668 99/295 |
| 2008/0317931 | A1 * | 12/2008 | Mandralis | B65D 85/8043 426/594 |
| 2009/0007794 | A1 * | 1/2009 | Cortese | A47J 31/3628 99/289 R |
| 2009/0007796 | A1 * | 1/2009 | Ricotti | A47J 31/0668 99/295 |
| 2009/0017177 | A1 * | 1/2009 | Yoakim | A47J 31/0678 426/431 |
| 2009/0126577 | A1 * | 5/2009 | Ternite | A47J 31/0673 99/295 |
| 2009/0158938 | A1 * | 6/2009 | Jarisch | A47J 31/3633 99/289 R |
| 2009/0205503 | A1 * | 8/2009 | Cortese | A47J 31/3628 99/295 |
| 2009/0255410 | A1 * | 10/2009 | Jarisch | A47J 31/3638 99/289 R |
| 2009/0280219 | A1 * | 11/2009 | Yoakim | B65D 85/8043 426/77 |
| 2010/0037779 | A1 * | 2/2010 | Pecci | A47J 31/3628 99/289 R |
| 2010/0043644 | A1 * | 2/2010 | Suggi Liverani | A47J 31/0668 99/295 |
| 2010/0043645 | A1 * | 2/2010 | Suggi Liverani | A47J 31/0668 99/295 |
| 2010/0043646 | A1 * | 2/2010 | Suggi Liverani | A47J 31/0668 99/295 |
| 2010/0064899 | A1 * | 3/2010 | Aardenburg | A47J 31/3633 99/295 |
| 2010/0077928 | A1 * | 4/2010 | Schmed | B65D 85/8043 99/295 |
| 2010/0101428 | A1 * | 4/2010 | Fin | A47J 31/3638 99/295 |
| 2010/0129512 | A1 * | 5/2010 | Accursi | A47J 31/0673 426/431 |
| 2010/0147156 | A1 * | 6/2010 | Colantonio | A47J 31/3628 99/295 |
| 2010/0154647 | A1 * | 6/2010 | Skalski | A47J 31/0668 99/290 |

(56) References Cited

U.S. PATENT DOCUMENTS

| | | | |
|---|---|---|---|
| 2010/0154651 A1* | 6/2010 | Skalski | A47J 31/0668 99/302 R |
| 2010/0180774 A1* | 7/2010 | Kollep | B65D 85/8043 99/295 |
| 2010/0186599 A1* | 7/2010 | Yoakim | A47J 31/22 99/295 |
| 2010/0203208 A1* | 8/2010 | Yoakim | A47J 31/22 426/431 |
| 2010/0288131 A1* | 11/2010 | Kilber | A47J 31/0673 99/295 |
| 2010/0303964 A1* | 12/2010 | Beaulieu | B65D 85/8043 426/77 |
| 2011/0030563 A9* | 2/2011 | Doglioni Majer | A47J 31/0673 99/295 |
| 2012/0258210 A1* | 10/2012 | Wong | A47J 31/3695 426/115 |
| 2014/0020565 A1* | 1/2014 | Nabeiro | B65D 85/8046 99/295 |
| 2014/0026761 A1* | 1/2014 | Bartoli | A47J 31/0668 99/295 |
| 2014/0072676 A1* | 3/2014 | Moutty | B65D 85/8043 426/112 |
| 2014/0287105 A1* | 9/2014 | Husband | B65D 85/8043 426/115 |
| 2015/0068405 A1* | 3/2015 | Bartoli | A47J 31/0668 99/295 |
| 2015/0108011 A1* | 4/2015 | Bartoli | A47J 31/407 206/0.5 |
| 2015/0196159 A1* | 7/2015 | Spiegel | B65D 85/8043 99/295 |
| 2015/0203285 A1* | 7/2015 | Baldo | A47J 31/407 426/112 |

FOREIGN PATENT DOCUMENTS

| | | |
|---|---|---|
| WO | 2006021405 A2 | 3/2006 |
| WO | 2009115475 A1 | 9/2009 |
| WO | 2014102701 A1 | 7/2014 |
| WO | 2015136433 A1 | 9/2015 |

* cited by examiner

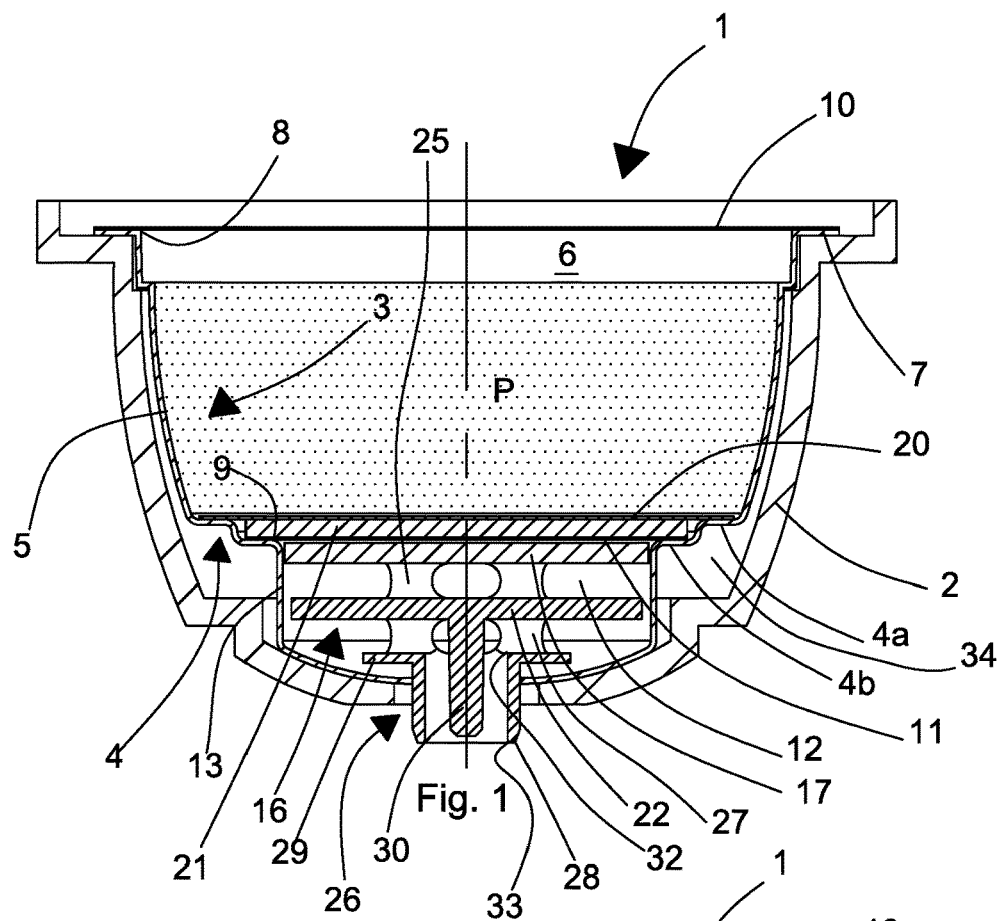
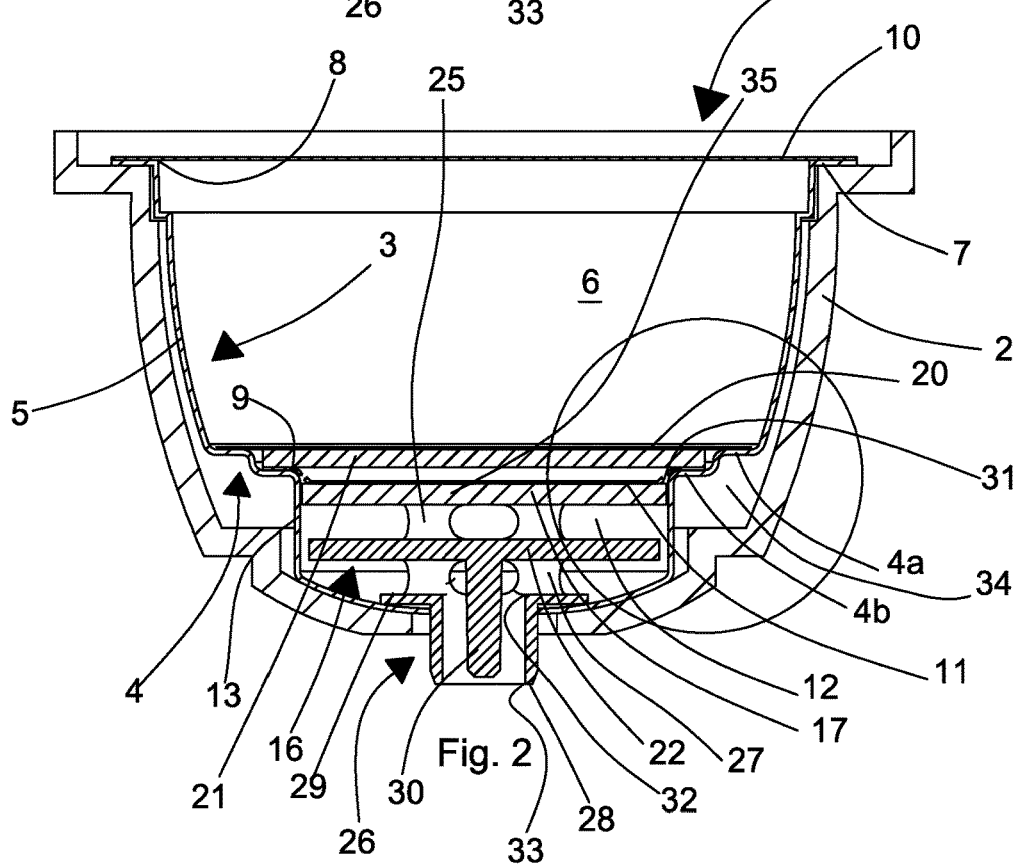

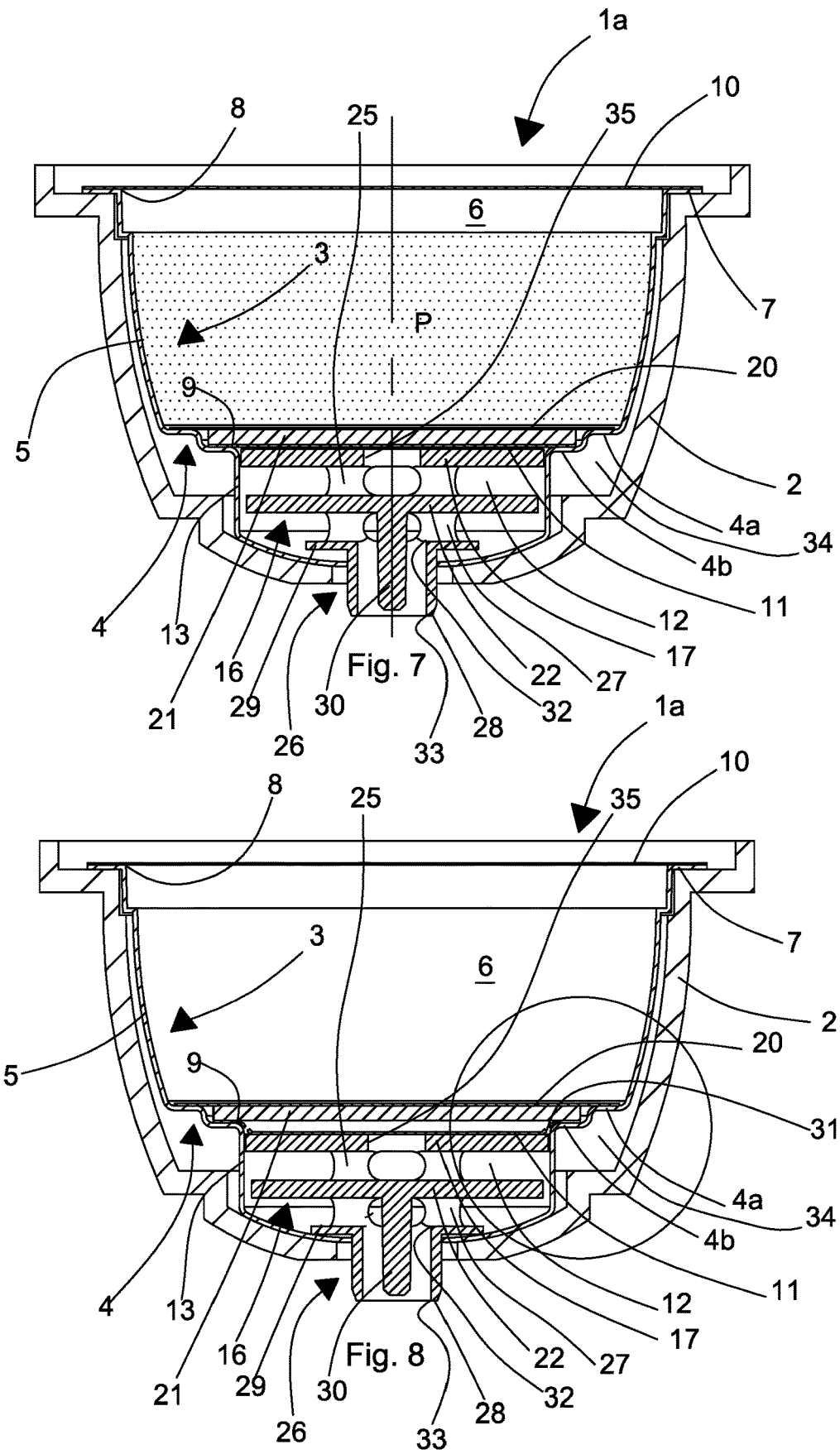

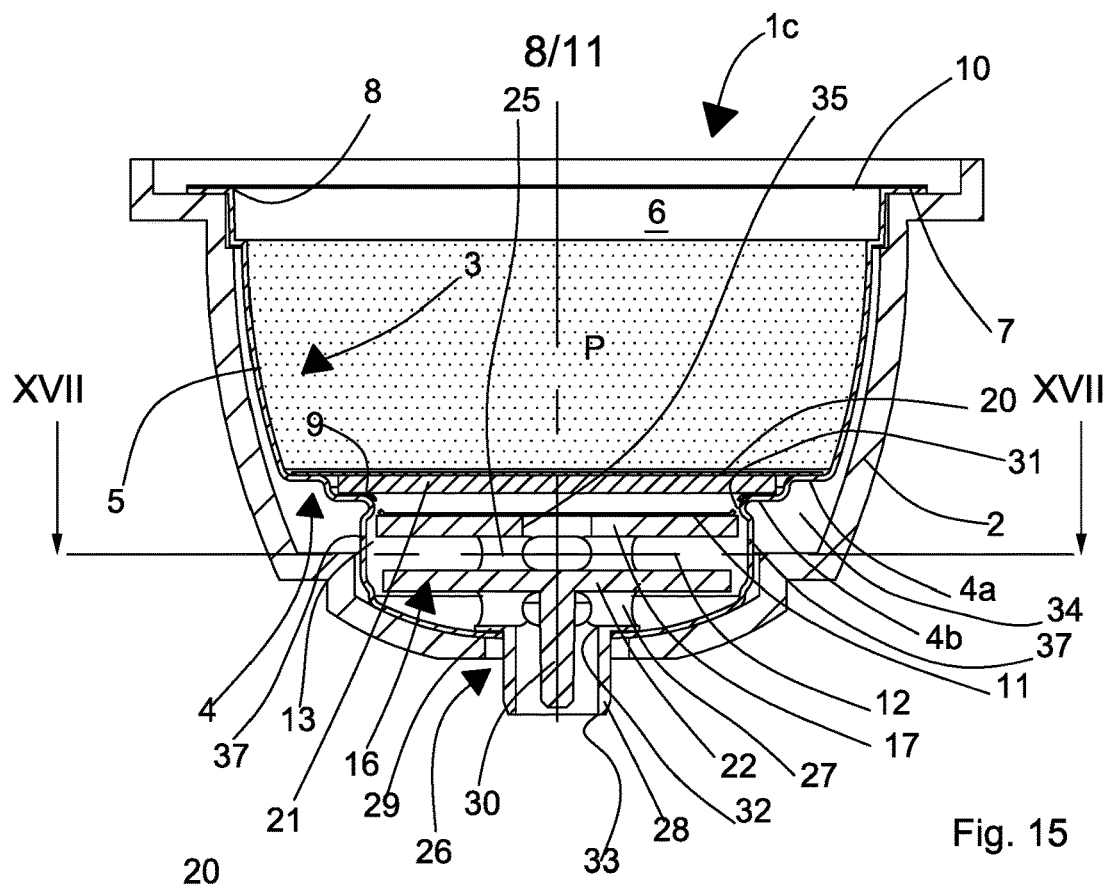
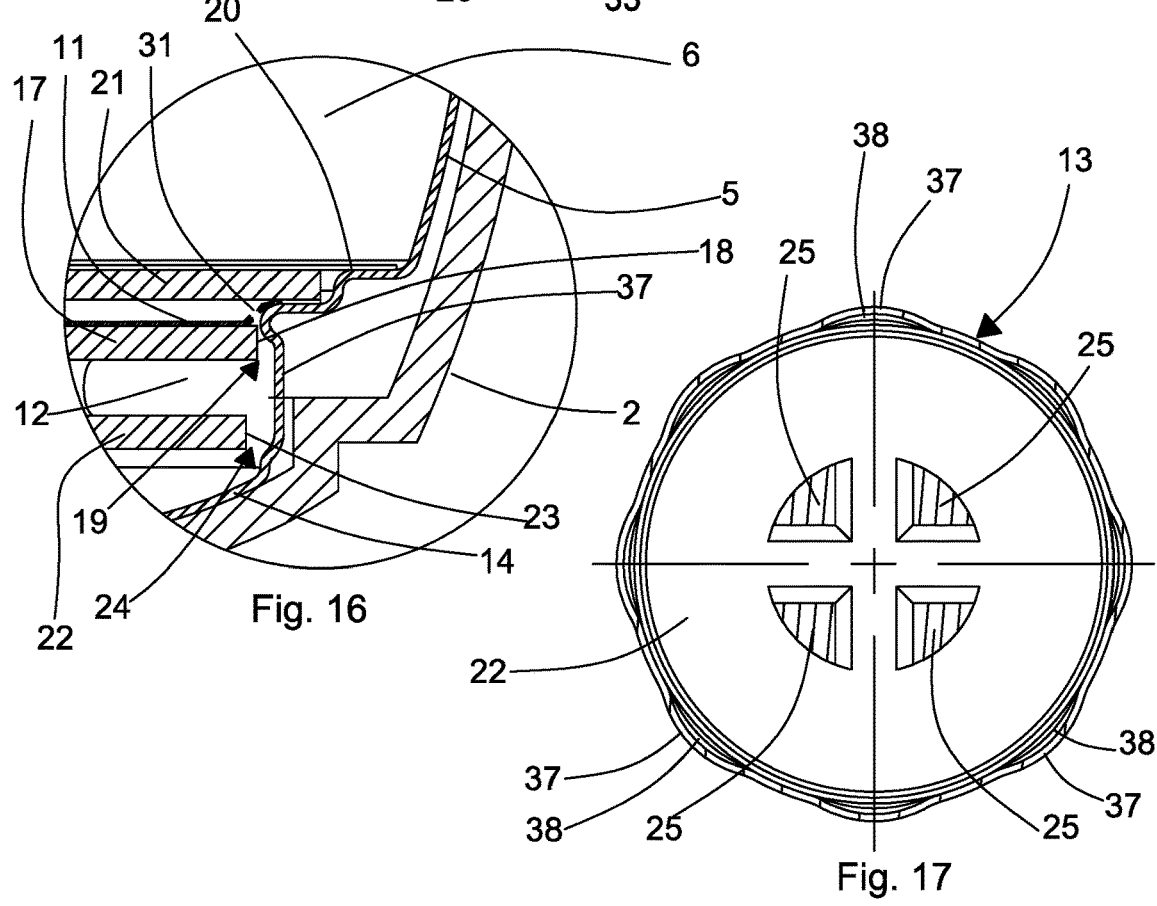
Fig. 15
Fig. 16
Fig. 17

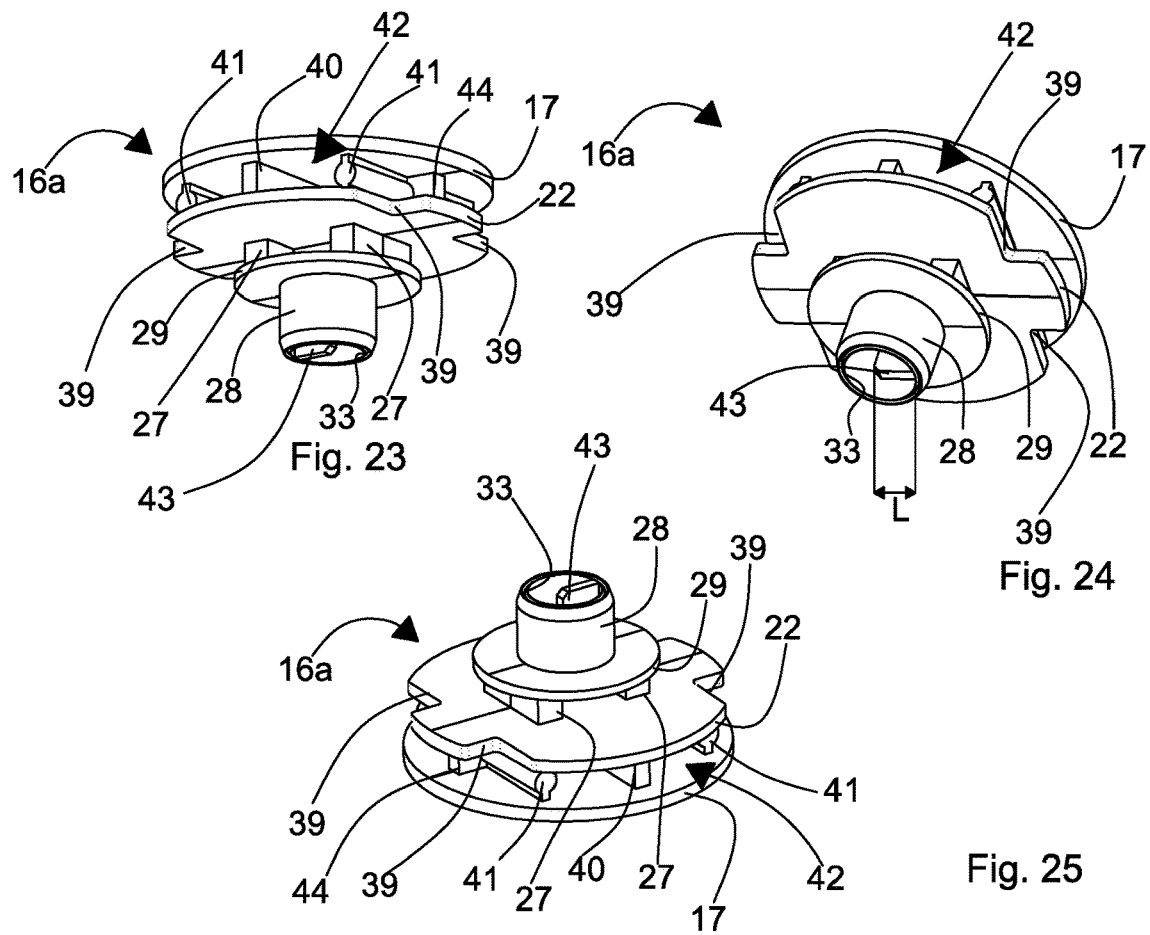
Fig. 23
Fig. 24
Fig. 25
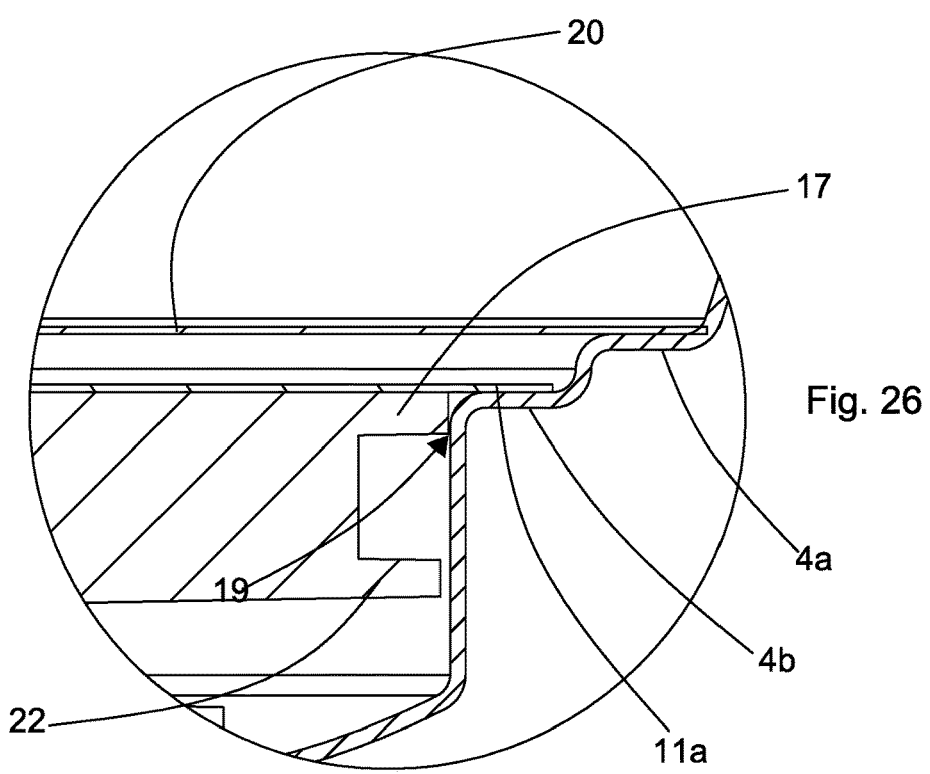
Fig. 26

CAPSULE FOR BEVERAGES

TECHNICAL FIELD

The invention relates to capsules or containers for preparing products, for example beverages, in automatic dispensing machines. In particular, the invention relates to a sealed, single-dose and disposable capsule containing an initial product that is able to make a final product by interacting with a pressurized liquid.

BACKGROUND

Capsules are known that are intended for use in dispensing machines, that consist of disposable and single-dose containers comprising an outer casing, made of plastics impermeable to liquids and to gases and having the shape of a beaker or cup. The casing has a bottom wall and a side wall defining an upper opening through which the product can be inserted from which to obtain the beverage. The upper opening is closed hermetically by a covering element, typically a film of aluminum or of plastics, so as to seal the product inside the container. The covering element is generally fixed to a peripheral and annular flange-shaped bottom of the casing, which is opposite the bottom wall and arranged around the upper opening.

In the bottom wall a lower opening is obtained through which the beverage is dispensed. The lower opening is closed hermetically by a closing element, typically a film of aluminum or of plastics like the covering element of the upper opening.

The capsule is perforable to enable the pressurized liquid, typically water, to be delivered inside the capsule. In particular, the covering element is perforable by suitable means of a dispensing machine to enable pressurized liquid to be delivered into the capsule.

The beverage is dispensed by breaking the closing element, which occurs when the pressure inside the capsule exceeds a preset value, depending on the mechanical resistance of the closing element.

One problem that occurs with this type of capsule arises from the fact that the breakage of the closing element causes a sudden change of pressure inside the capsule, which can trigger the so-called "water hammer", which can lead to the capsule exploding and also to damage to the hydraulic circuit of the dispensing machine, because the pressure waves generated by the water hammer can propagate in the nozzles that deliver the pressurized liquid to the capsule and, from the nozzles, to the entire hydraulic circuit of the dispensing machine.

A further problem that occurs with this type of capsule is due to the fact that, when the closing element breaks, the pressurized liquid exits from the capsule at high speed, and reaching a container intended to receive the beverage can cause squirts that exit the container, soiling the dispensing machine and the zone surrounding the container.

In order to overcome the aforesaid problems, capsules have been designed that are provided, downstream of the lower opening, with one or more labyrinth paths, the object of which is to decrease the speed of the beverage leaving the capsule, to avoid the formation of squirts when the beverage reaches the container intended to receive the beverage, and generate load losses that make the pressure drop less sudden, i.e. more progressive, inside the capsule at the moment of breakage of the closing element of the lower opening.

Manufacturing these labyrinth paths is nevertheless expensive and greatly increases the cost of manufacturing of the capsule, in addition to not fully guaranteeing that a water hammer does not occur when the closing element breaks.

From patent application 102014902241964, in the name of the same applicant, a capsule is further known in which, below the lower opening, a chamber is obtained in which a damping element is arranged for controlling the exit speed of the beverage.

The damping element is able to reduce, but not to eliminate completely, the risk of a water hammer occurring, when the closing element is broken.

SUMMARY

One object of the present invention is to make a capsule that is usable in known dispensing machines that prevents the phenomenon of the water hammer occurring when the closing element of the lower opening of the capsule breaks and prevents the formation of squirts during dispensing of the beverage.

A further object is to obtain a capsule that is cheap and simple to make.

These objects are achieved by a capsule and system for preparing beverages according to the invention.

BRIEF DESCRIPTION OF THE DRAWINGS

The invention can be better understood and implemented with reference to the attached drawings that illustrate some embodiments thereof by way of non-limiting example, in which:

FIG. 1 is a schematic cross section of a first embodiment of a capsule according to the invention, which is inserted into a seat of a beverage dispensing machine, before dispensing of the beverage starts;

FIG. 2 is a section like that of FIG. 1, after the start of dispensing of the beverage;

FIG. 7 is a cross section of a second embodiment of a capsule according to the invention, inserted into a seat of a beverage dispensing machine, before dispensing of the beverage starts;

FIG. 8 is a section like that of FIG. 7, after the start of dispensing of the beverage;

FIG. 15 is a section like that of FIG. 14, after the start of dispensing of the beverage;

FIG. 16 is an enlarged detail of FIG. 15;

FIG. 17 is the section XVII-XVII of FIG. 15;

FIGS. 23, 24 and 25 are perspective views from different points of view of a detail of FIG. 18;

FIG. 26 is an enlarged detail of FIG. 18.

DETAILED DESCRIPTION

Figure 3:
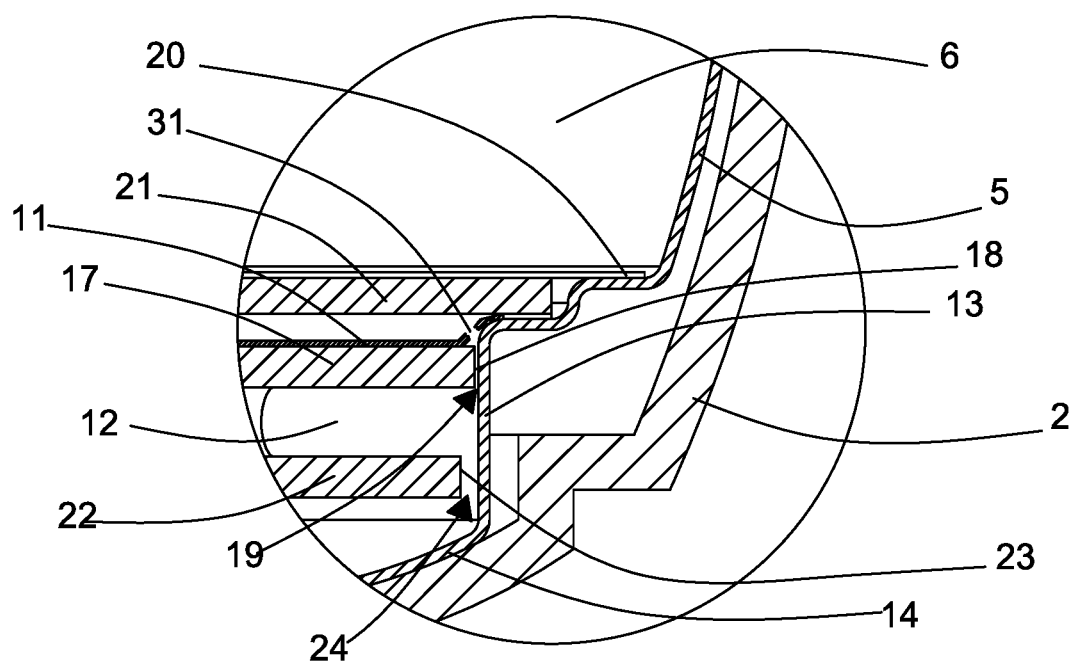
FIG. 3 is an enlarged detail of FIG. 2.
Figure 4:
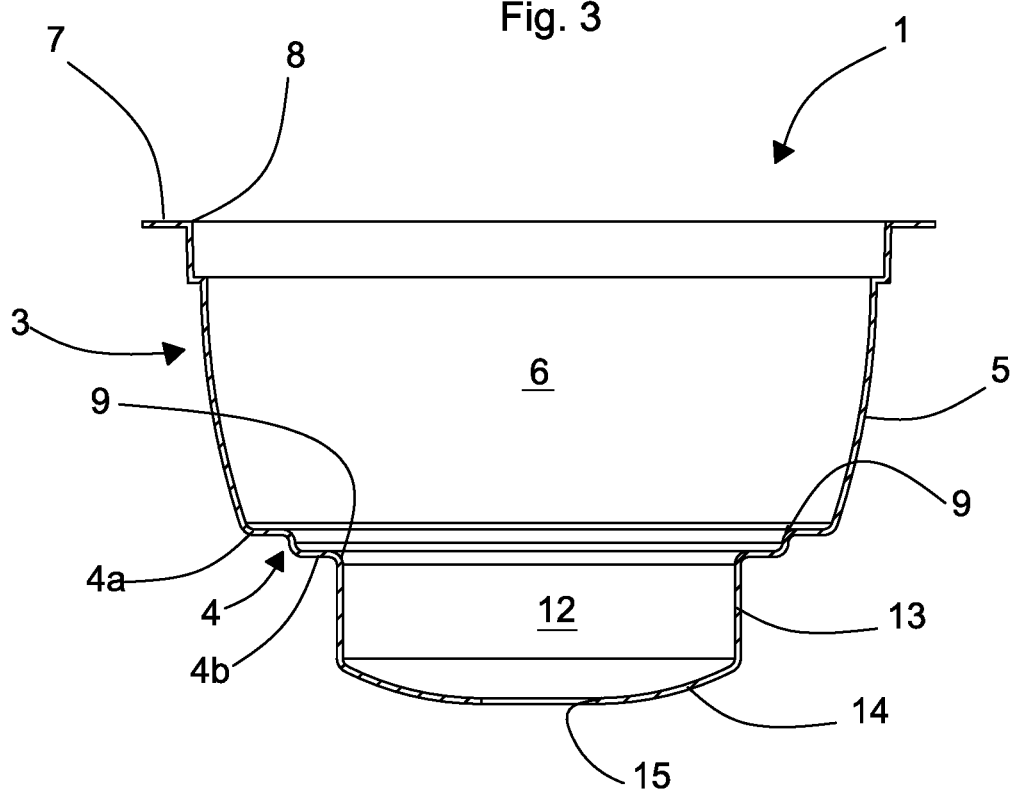
FIG. 4 is a cross section of only the capsule body.
Figure 5:
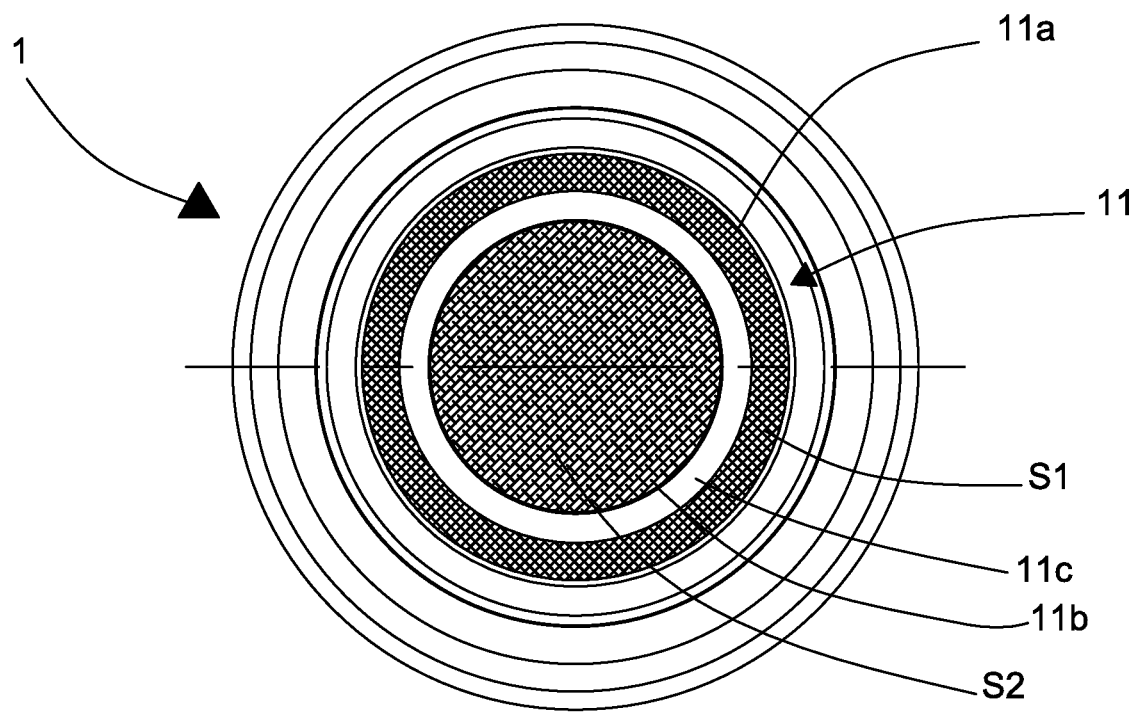
FIG. 5 is a schematic view of the inside of the capsule in which a first embodiment of fixing of the lower closing element is highlighted.
Figure 6:
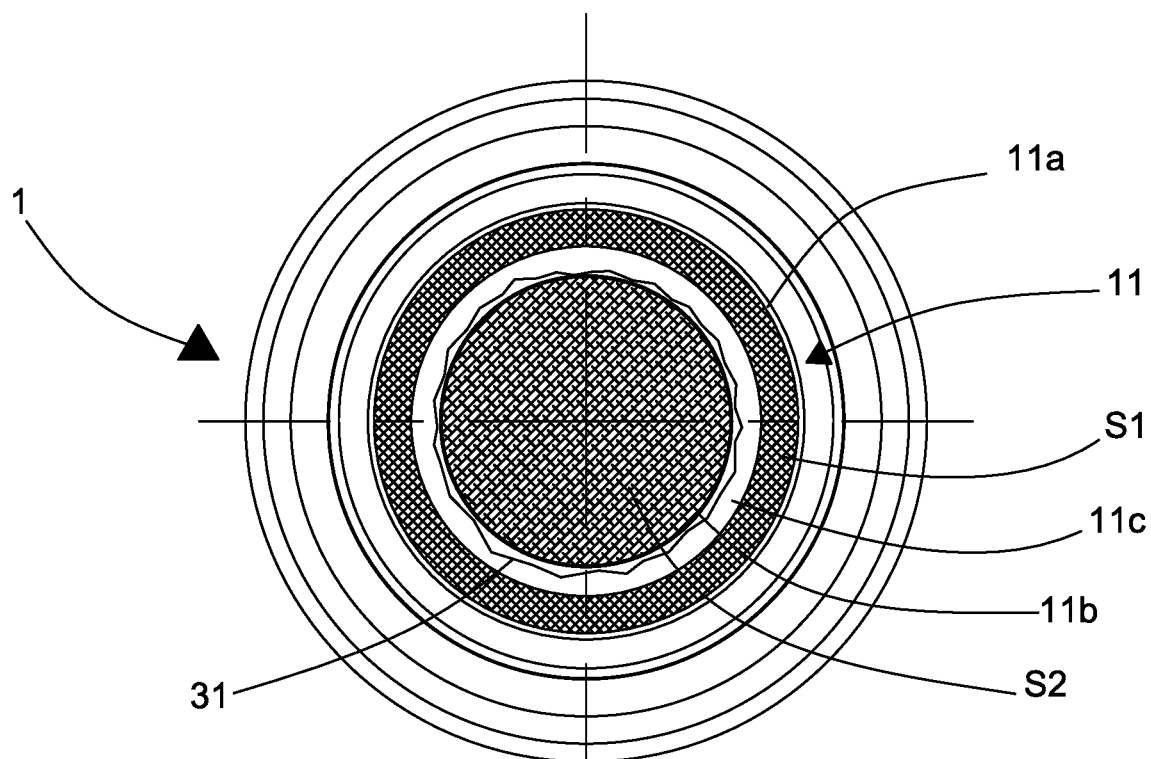
FIG. 6 is a view like that of FIG. 5 highlighting a line of tearing of the lower closing element, through the effect of the pressure of the liquid delivered into the capsule.
Figure 9:
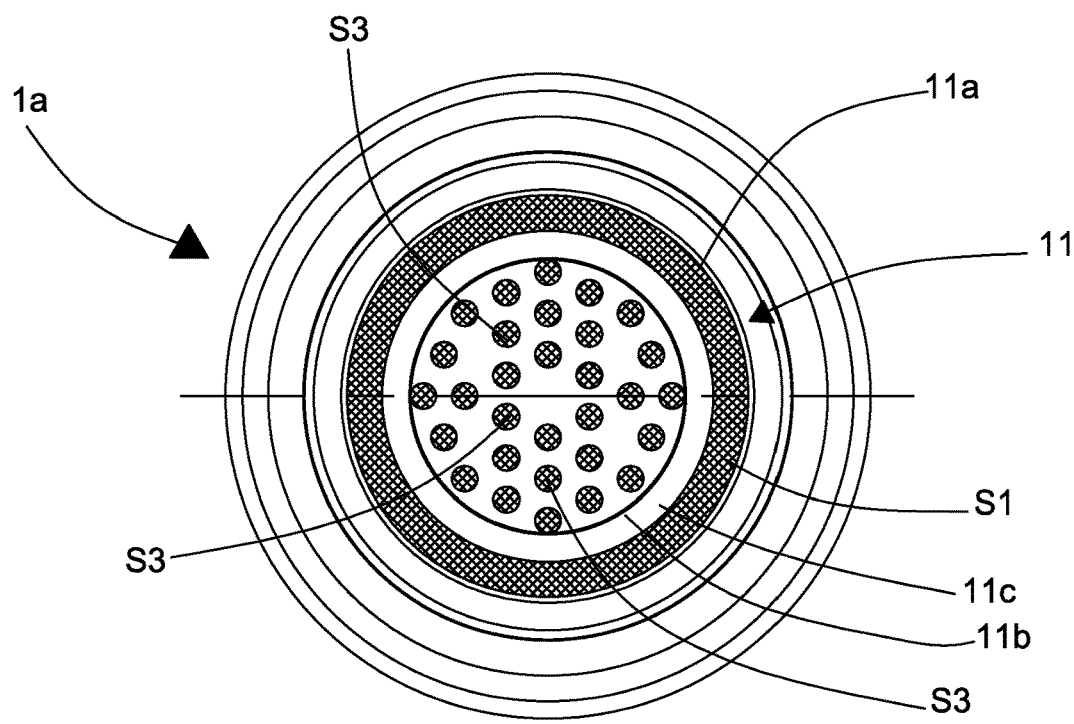
FIGS. 9 and 10 are views like those of FIG. 5 that illustrate respectively a second and a third embodiment of fixing of the lower closing element.

In FIGS. 1 to 6 a first embodiment is illustrated of a capsule 1 for beverages according to the invention, usable in an automatic dispensing machine for producing a final product, in particular a hot beverage, for example coffee, barley, herbal tea, tea, chocolate, etc., by injecting a hot pressurized fluid, for example water, thereinto. The capsule 1 is inserted into a seat 2 of the automatic dispensing machine of a system for preparing a beverage.

The capsule 1 according to the invention comprises an outer casing or container 3, in turn comprising a base wall 4 and a first portion of side wall 5 defining a cavity 6 that is open and suitable for containing an initial product P, for example a soluble or percolable food product to be combined with a fluid, typically water, to obtain a final product in the form of a beverage. The base wall 4 and the first portion of side wall 5 define a body of the capsule 1 that is substantially beaker or cup-shaped.

The base wall 4 comprises an annular first shoulder 4a, linked to the first portion of side wall 5 and an annular second shoulder 4b. The annular second shoulder 4b has smaller dimensions than dimensions of the annular shoulder 4a and is placed below the annular first shoulder 4a and is linked thereto, as represented in the figures.

The casing further comprises an upper edge 7 in the shape of a flange connected to the first portion of side wall 5 and extending therefrom, arranged around a first opening 8 of the cavity 6, opposite the base wall 4. The upper edge 7 is also opposite the base wall 4 and faces outside with respect to the cavity 6.

In the base wall 4 a second opening 9 is obtained, through which the beverage prepared from the initial product P can exit the cavity 6.

The casing 3 is in fact made by forming a sheet of thermoformable plastic material that is suitable for the process of preparing the final product from the initial product, for example able to bear without deformation temperatures up to 100° C. and pressure up to at least 5 bar.

This sheet of plastics can have a thickness comprised between 15 micron and 1400 micron, in particular between 350 micron and 1200 micron and is made of a polyolefin, for example polypropylene PP and/or polyethylene PE and/or polyamide PA.

In detail, the sheet material can comprise a first layer of material, in particular suitable for contacting and/or preserving the initial product P, for example made of polypropylene PP that is impermeable to humidity, a second layer of material that is not in contact with the initial product P made of gas-impermeable material, in particular impermeable to oxygen and optionally also to humidity, also known as a barrier layer, and a third layer of external material.

The barrier layer, interposed between the first and second layer, ensures complete insulation of the external environment of the cavity 6, in particular if the first layer is permeable over time to oxygen. The barrier layer has a thickness comprised between 2 micron and 100 micron, in particular between 15 micron and 70 micron, and is made for example of ethylene vinyl alcohol (EVOH), which is gas-impermeable only to oxygen or polyvinylidene chloride (PVDC), which is gas-impermeable to both oxygen and to humidity.

According to a first embodiment (which is not shown) of the sheet material, the first and third layer are made of the same material, for example polypropylene PP and are coupled with the barrier layer that is interposed therebetween. Such layers can have the same thickness (for example 350 micron), or different thicknesses (for example the first layer can have a thickness of 500 micron whereas the third layer can have a thickness of 300 micron).

According to a second embodiment (which is not shown), the first layer is a support and is made of polypropylene PP, the second layer is the barrier layer (EVOH or PVDC) and the third layer is an extruded layer of polypropylene PP or polyethylene PE, of thickness that is equal to 15 micron, which is coupled with the first and the second layer during the process of producing the sheet material.

The sheet material, both according to the first and the second embodiment, is then selected in such a manner as to protect over time the initial product P contained in the capsule from humidity and oxygen.

The capsule further comprises a covering element 10 fixed to the upper edge 7 of the casing 3 for hermetically closing the first opening 8 of the cavity 6. The covering element 10 comprises an aluminum film or a film of plastics provided with a barrier layer that is perforable by injecting means (that is not shown) by means of which a pressurized liquid, for example water, is injected inside the cavity 6 to produce the beverage.

The covering element 10 is fixed to the upper edge 7 of the casing 3 by heat or ultrasound welding, or by gluing. Preferably the covering element 10 is fixed to the casing 3 by heat welding.

The second opening 9, preferably of circular shape, in the base wall 4 is also closed hermetically by a closing element 11, which is similar to the covering element 10. A peripheral zone 11a of the closing element 11 is fixed to the second shoulder 4b of the base wall 4, inside the cavity 6, by a first heat or ultrasound weld S1, or by gluing.

The covering element 10 and the closing element 11 close the cavity 6 hermetically and preserve the initial product P contained therein.

The closing element 11 is intended to tear when, following the delivery of pressurized liquid into the cavity 6, the pressure inside the cavity 6 exceeds a preset value, depending on the mechanical resistance of the material of which the closing element 11 is made. Tearing the closing element 11 causes the beverage to exit the cavity 6 and the subsequent dispensing thereof into a container intended to receive the beverage, for example a cup or a glass, as will be explained in greater detail below.

In the lower part of the cavity 6 a first filtering element 20 is arranged, for example made of paper, fixed, for example by gluing, to the first shoulder 4a of the base wall 4, and a second filtering element 21, for example made of nonwoven fabric, which rests on the second shoulder 4b of the base wall 4, above the closing element 11. The first filtering element 20 and the second filtering element 21 prevent particles of the product P being able to be dispensed together with the beverage, when the product P is not a soluble product, such as, for example, coffee powder.

It is advantageous for the second filtering element 21 to have great resistance to deformation, such that it does not get significantly deformed through the effect of the pressure that develops in the cavity 6 when a pressurized liquid is delivered thereinto to prepare the beverage.

Under the base wall 4, as represented in the figures, a chamber 12 is defined that can communicate with the cavity 6 through the second opening 9. The chamber 12 is defined by a second portion 13 of side wall and by a bottom wall 14, in the center of which a third opening 15 is made. The chamber 12 has a cross section of preferably circular shape, but can also have a different section from the circular section, for example an elliptical section or polygonal section or lobed section.

Inside the chamber 12 a damping element 16 is arranged, the function of which is to control the exit speed of the beverage, in particular to prevent the phenomenon of water hammer at the moment of tearing of the closing element 11, preventing pressure waves forming that are generated by the aforesaid phenomenon, which could cause the capsule to explode and also damage to the hydraulic circuit of the dispensing machine.

The damping element 16 also performs the function of preventing the formation of squirts during the dispensing of the beverage into a container.

The damping element 16 comprises a disc-shaped upper part 17, with a preferably rectangular cross section, so dimensioned that between an outer edge 18 thereof and the second portion of side wall 13 a first passage 19 (FIG. 3) is defined having a width that is sufficient to enable the damping element 16 to slide inside the chamber 12, but as to slow significantly the speed of the beverage passing therethrough and generate a significant pressure difference between the inlet and the outlet of the passage 19. Preferably, the width of the passage 19 is not greater than 1 mm.

The damping element 16 further comprises a lower part 22, which is also disc-shaped, with a preferably rectangular cross section, dimensioned in such a manner that between the outer edge 23 thereof and the second portion of side wall 13 a second passage 24 is defined having a width that is significantly greater than the width of the passage 19 sufficient to enable the beverage to pass without generating significant load losses. The upper part 17 and the lower part 22 of the damping element 16 are connected together by first connecting elements 25, which are, for example, column-shaped.

The damping element 16 further comprises a dispensing element 26 through which the beverage is dispensed that is prepared with the product P contained in the cavity 6 of the capsule 1.

The dispensing element 26 is fixed below the lower part 22 by second connecting elements 27, which are also, for example, column-shaped.

The dispensing element 26 comprises a hollow cylindrical body 28, provided above with an annular edge 29 protruding outside of the hollow cylindrical body 28.

The hollow cylindrical body 28 is provided with an inlet opening 32 through which the beverage can enter therein and with an outlet opening 33 through which the beverage can exit the capsule 1. The hollow cylindrical body 28 is inserted into the third opening 15 in the center of the bottom wall 14 of the capsule 1.

The outer diameter of the hollow cylindrical body 28 is selected in such a manner that the hollow cylindrical body 28 is coupled with slight interference with the third opening 15, such that a seal is assured against leaking of liquid between the hollow cylindrical body 28 and the bottom wall 14 of the capsule 1, but the hollow cylindrical body 28 is not prevented from sliding into the third opening 15 if a thrust is applied to the damping element 16 that is sufficient to overcome the friction resistance between the hollow cylindrical body 28 and the bottom wall 14.

The lower part 22 of the damping element 16 is provided below with an elongated protrusion 30 that extends inside the hollow cylindrical body 28 of the dispensing element 26 and guides the flow of the beverage such as to prevent squirts during dispensing.

The closing element 11, which, as already said, is fixed peripherally to the second shoulder 4b of the base wall 4, is further fixed at a central zone 11b thereof, by a second weld S2, preferably a heat weld, to the upper part 17 of the damping element 16. The second weld S2 is made on the entire surface of the central zone 11b. Between the peripheral zone 11a and the central zone 11b of the closing element 11 an annular zone 11c can be defined that is devoid of welding and straddles the first passage 19 between the upper part 17 of the damping element 16 and the second portion of side wall 13. The width of the annular zone 11c can also be substantially the same as the width of the first passage 19.

To prepare a beverage with the product P contained in the capsule 1 and dispense the beverage into a container, the injectors of the dispensing machine into which the capsule 1 is inserted perforate the covering element 10 and deliver into the cavity 6 of the capsule a pressurized liquid, for example water, which is mixed with the product P.

The pressurized liquid exerts a thrust on the closing element 11 and on the damping element 16 below. When the value of said thrust exceeds the friction resistance between the hollow cylindrical body 28 and the bottom wall 14 of the capsule 1, the damping element 16 moves downwards, moving from an initial position shown in FIG. 1 as far as a final position, shown in FIG. 2, in which the annular edge 29 of the dispensing element 26 rests on the bottom wall 14 of the capsule 1.

During the aforesaid movement, the damping element 16 drags with itself downwards the central zone 11b of the closing element 11, which is fixed to the upper part 17 of the damping element 16, whilst the peripheral zone 11a does not move, being fixed to the base wall 4. This generates progressively increasing dragging stress that causes breaking of the closing element 11 along a fracture line 31.

Following breakage of the closing element 11 the pressurized beverage contained in the cavity 6 enters the chamber 12 and starts to filter through the first passage 19 and then traverses the second passage 24 and enters the hollow cylindrical body 28, passing through the inlet opening 32 and exits the capsule 1 through the outlet opening 33.

When the beverage starts to filter through the passage 19, the pressure thereof determines a thrust on the second portion 13 of side wall of the capsule 1. In the seat 2 of the dispensing machine into which the capsule is inserted a space 34 is provided that surrounds the second portion 13 of side wall so as to enable said second portion 13 to get progressively deformed outwards, thus widening the passage 19 so as to make the transit easier of the beverage through, without nevertheless causing a sudden fall in pressure in the chamber 6 of the capsule 5, such that the phenomenon of the water hammer is securely avoided.

When the pressure inside the cavity 6 starts to decrease through the effect of the progressive passage of the beverage into the chamber 12 below, the deformation of the second portion 13 of side wall starts to decrease and the first passage 19 starts to shrink until it returns to the initial dimensions. At this point, in general, the pressure in the chamber 6 is no longer sufficient to overcome the load losses in the first passage 19, which cases the end of dispensing of the beverage.

In FIGS. 7 to 10 a second embodiment of a capsule according to the invention is shown, indicated by the reference number 1a.

In this second embodiment, in the upper part 17 of the damping element 16, in a substantially central position, a through hole 35 is provided. Further, the central zone 11b of the closing element 11 is fixed to the upper part 17 of the damping element 16 with a spot weld S3.

For the rest, the capsule 1a is identical to the capsule 1 according to the first embodiment illustrated in FIGS. 1 to 6.

When the damping element 16 is pushed downwards by the pressure of the beverage in the cavity 6 the parts of the central zone 11b of the closing element 11 that are not affected by the spot weld S3 separate from the upper part 17 of the damping element 16 creating passages that, when the fracture of the closing element 11 occurs, enable the beverage to enter the chamber 12 also through the through hole 35. This enables complete emptying of the cavity 6 to be obtained, because the beverage can continue to pass from the cavity 6 to the chamber 12 even when the pressure inside the cavity 6 is no longer sufficient to pass the beverage through the first passage 19.

Figure 10:
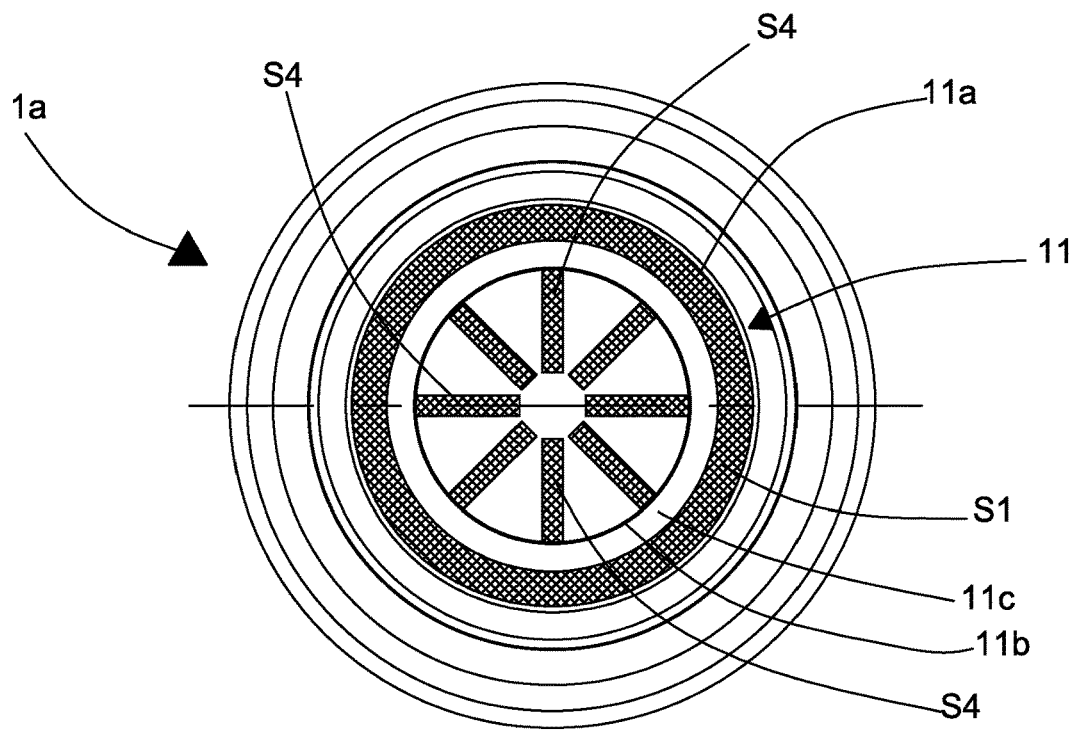

In FIG. 10 a version is illustrated of the fixing of the closing element 11 to the upper part 17 of the damping element 16. In this version, the central zone 11b of the closing element 11 is fixed to said upper part 17 by a plurality of substantially radial welds S4.

When the damping element 16 is pushed downwards by the pressure of the beverage in the cavity 6 the parts of the central zone 11b of the closing element 11 that are not affected by the radial welds S4 separate from the upper part 17 of the damping element 16 creating passages, that, when the fracture of the closing element 11 occurs, enable the beverage to enter the chamber 12 also through the through hole 35, thus making possible complete emptying of the cavity 6, as disclosed above.

Figure 11:
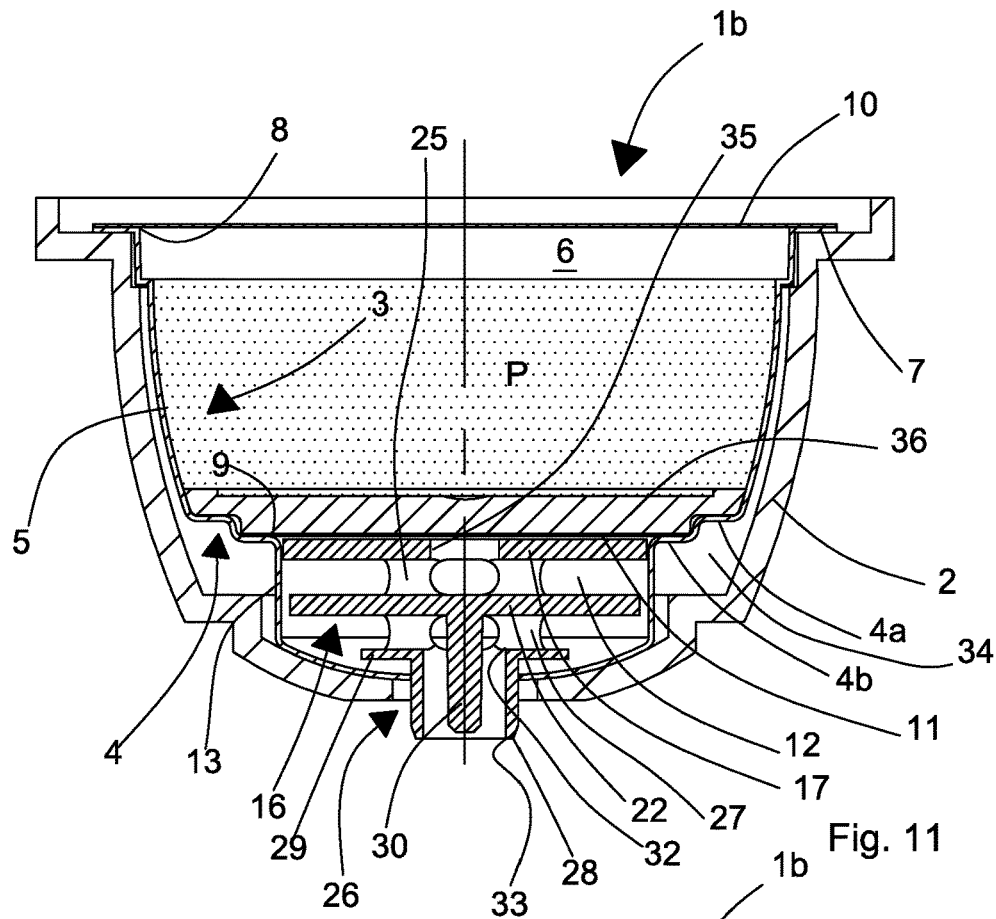
FIG. 11 is a cross section of a third embodiment of a capsule according to the invention, inserted into a seat of a beverage dispensing machine, before dispensing of the beverage starts.
Figure 12:
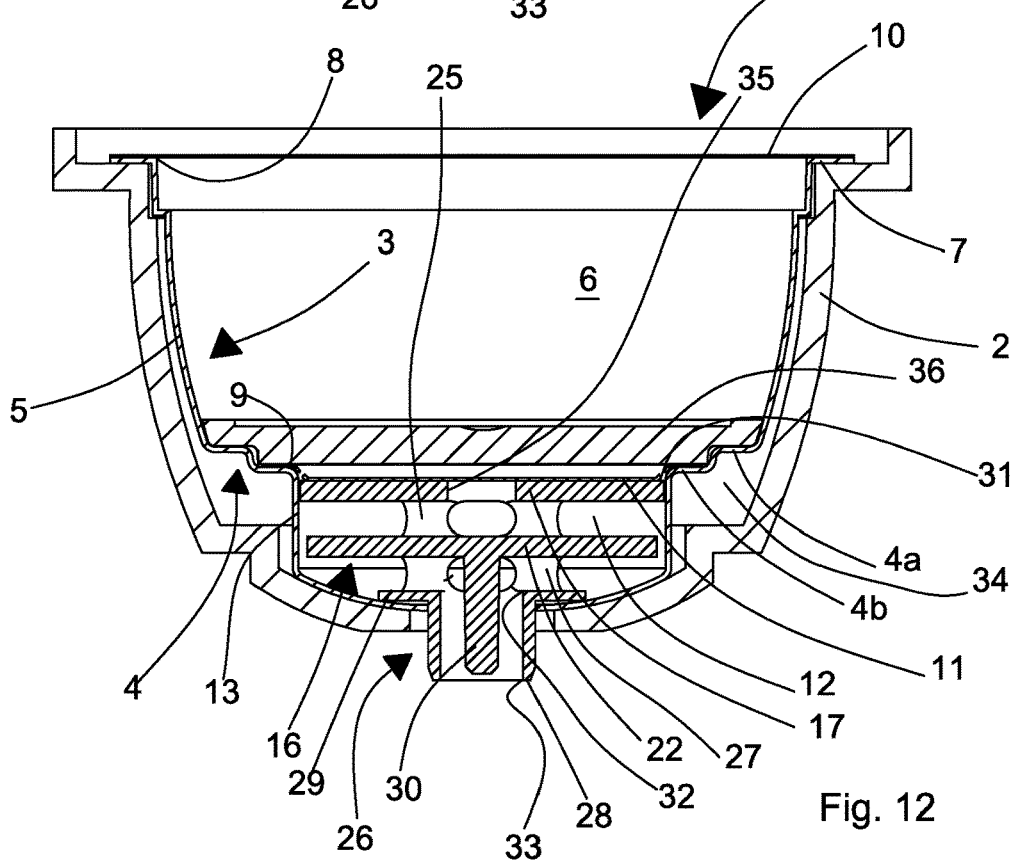
FIG. 12 is a section like that of FIG. 11, after the start of dispensing of the beverage.
Figure 13:
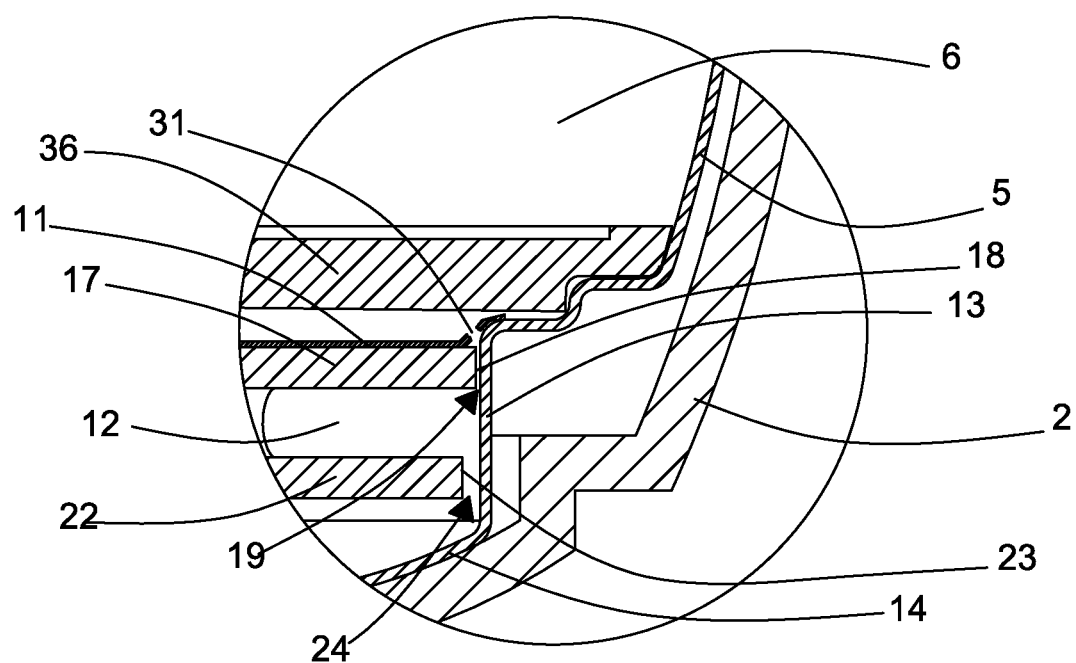
FIG. 13 is an enlarged detail of FIG. 12.
Figure 14:
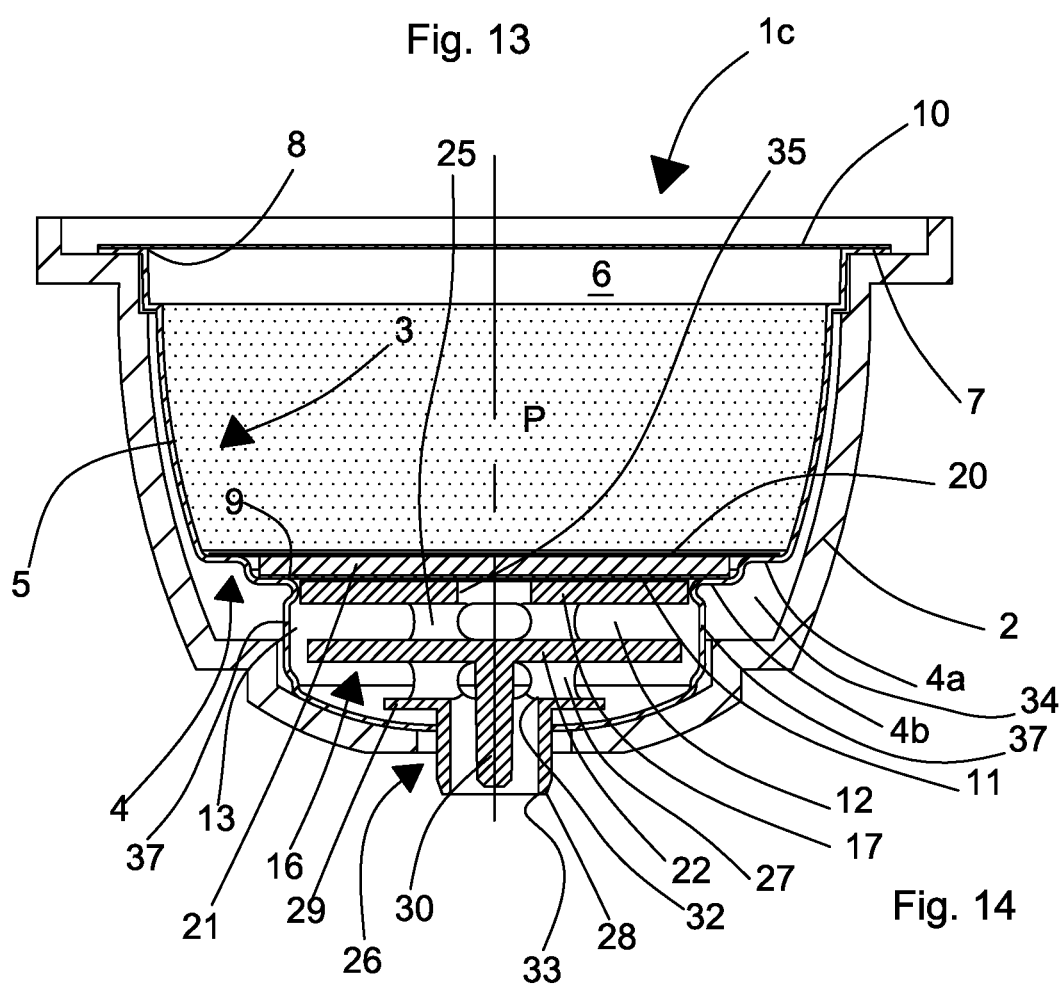
FIG. 14 is a cross section of a fourth embodiment of a capsule according to the invention, inserted into a seat of a beverage dispensing machine, before dispensing of the beverages starts.
Figure 18:
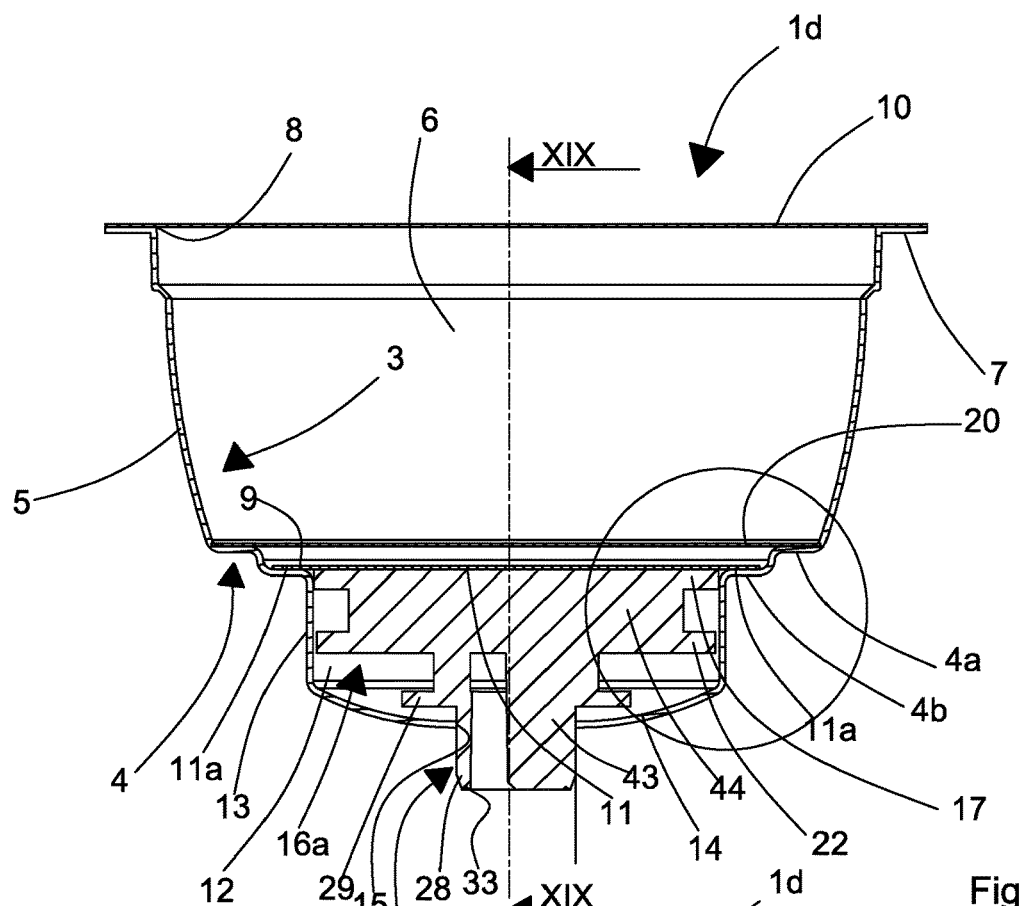
FIG. 18 is a cross section of a fifth embodiment of a capsule according to the invention.
Figure 19:
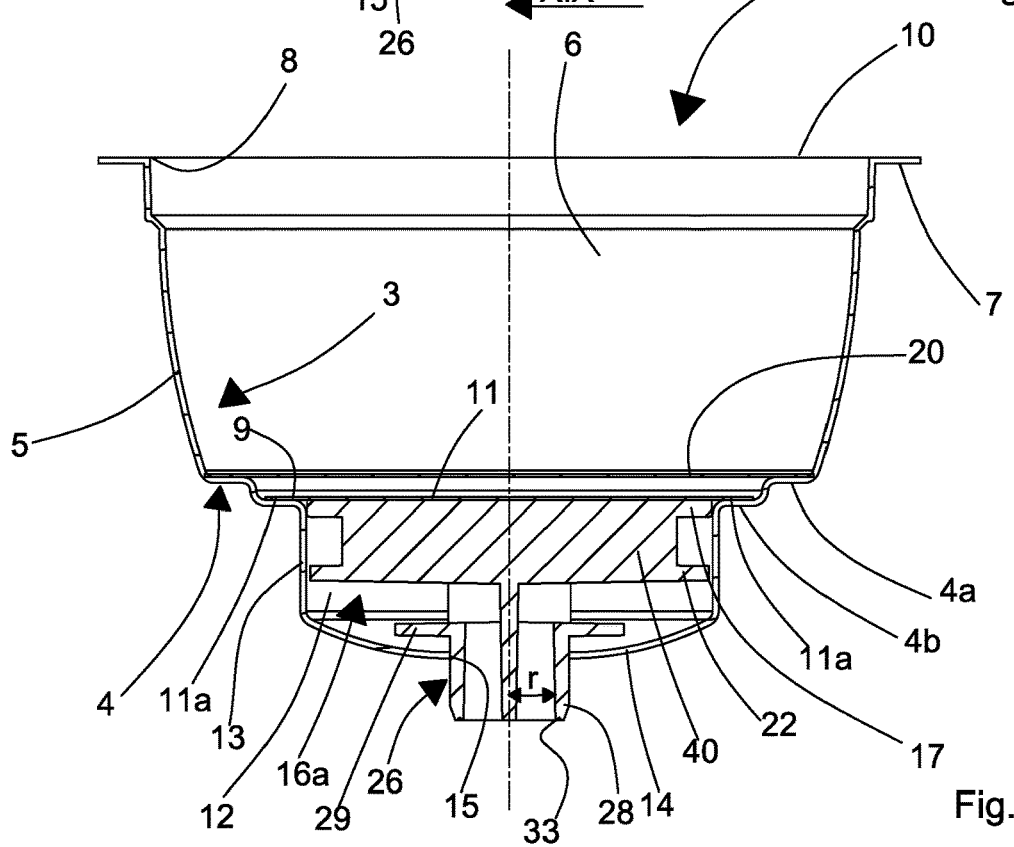
FIG. 19 is the section XIX-XIX of FIG. 18.
Figure 20:
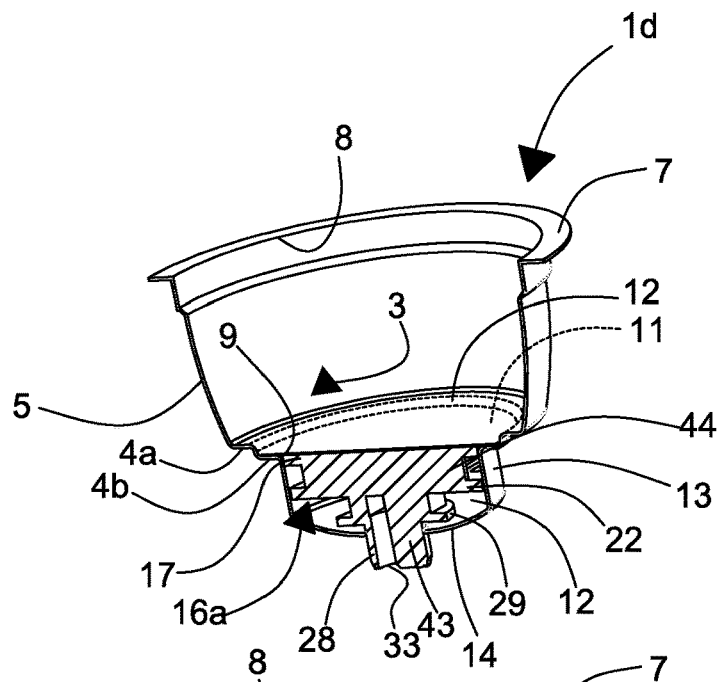
FIG. 20 is fragmentary, perspective and partially sectioned view of the capsule of FIG. 18.
Figure 21:
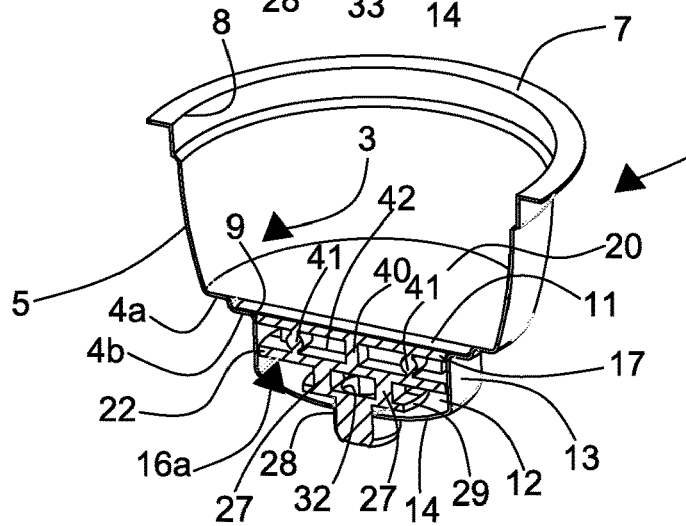
FIG. 21 is another fragmentary, perspective and partially sectioned view of the capsule of FIG. 18.
Figure 22:
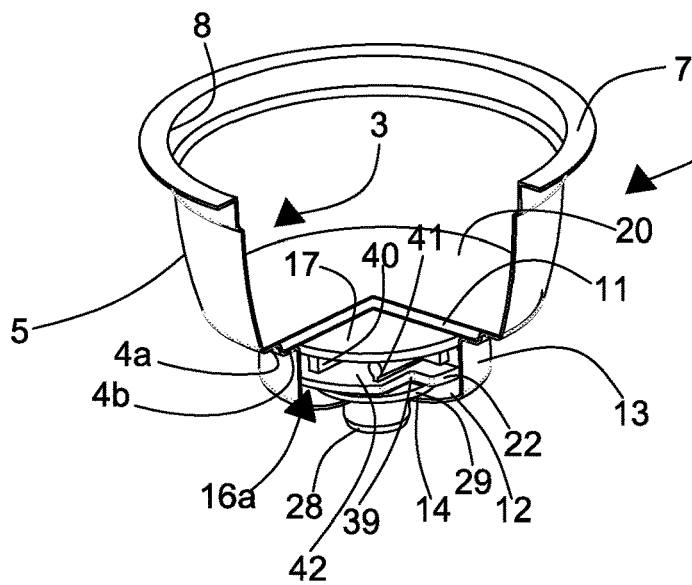
FIG. 22 is a further fragmentary, perspective view of the capsule of FIG. 18.

In FIGS. 11 to 13 a third embodiment is illustrated of a capsule according to the invention, indicated by the reference number 1b.

This third embodiment differs from the first and second embodiment disclosed in FIGS. 1 to 10 through the fact that instead of the first filtering element 20 and of the second filtering element 21 a single filtering element 36 is provided consisting of a disc, for example made of plastics, in which a plurality of through holes is made, the dimensions of which are selected in such a manner as to enable the beverage to pass, but to prevent the passage of solid particles, for example coffee powder, to prevent the latter being able to be dispensed together with the beverage.

For the rest, the capsule 1b is identical to the capsule 1 illustrated in FIGS. 1 to 6, or to the capsule 1a, illustrated in FIGS. 7 to 10.

In FIGS. 14 to 17 a fourth embodiment of a capsule according to the invention is illustrated, indicated by the reference number 1c.

This fourth embodiment differs from the other embodiments illustrated in FIGS. 1 to 13, through the fact that the second portion 13 of side wall has a lobed shape with a plurality of portions 37 protruding outwards. At these protruding portions 37, the first passage 19 and the second passage 24 have respective widenings 38, which, in the case of a beverage that contains solid or semisolid elements, such as a soup for example, enable these solid elements to pass and be dispensed together with the beverage and/or substantially prevent the formation of foam.

For the rest, the capsule 1c is identical to the capsule 1 illustrated in FIGS. 1 to 6, or to the capsule 1a, illustrated in FIGS. 7 to 10, or to the capsule 1b illustrated in FIGS. 11 to 13.

In further embodiment, which is not shown, of the capsule according to the invention the closing element 11 is not fixed to the upper part 17 of the damping element 16.

In this further embodiment, when a pressurized liquid is delivered into the chamber 6, the closing element 11 is deformed in the direction of the damping element 16 and moves the latter between said first position and said second position, remaining resting on the first part 17 of the damping element 16. The deformation of the closing element 11 causes pulling stress on the element that causes the closing element 11 to tear when the mechanical resistance of the material of which the closing element 11 is made is exceeded. The distance between the first position and second position of the closing element 11 is selected in such a manner that tearing of the closing element 11 can occur before the damping element 16 reaches said second position.

After tearing of the closing element 11 has occurred, the beverage is dispensed as disclosed previously.

In FIGS. 18 to 26 a fifth embodiment is shown of a capsule according to the invention, indicated by the reference number 1d.

Similarly to the other embodiments of capsules according to the invention, the capsule 1d according to the invention comprises an outer casing or container 3, in turn comprising a base wall 4 and a first portion of side wall 5 defining a cavity 6 that is open and suitable for containing an initial product P, for example a soluble or percolable food product to be combined with a fluid, typically water, to obtain an end product in the form of a beverage. The base wall 4 and the first portion of side wall 5 define a body of the capsule 1d that is substantially beaker or cup-shaped.

The base wall 4 comprises an annular first shoulder 4a, linked to the first portion of side wall 5 and an annular second shoulder 4b. The annular second shoulder 4b can have smaller dimensions than dimensions of the annular shoulder 4a, is placed below the annular first shoulder 4a and is linked thereto, as represented in the figures.

The casing further comprises a flange-shaped upper edge 7 connected to the first portion of side wall 5 and extending therefrom, arranged inside a first opening 8 of the cavity 6, opposite the base wall 4. The upper edge 7 is also opposite the base wall 4 and faces outside with respect to the cavity 6.

In the base wall 4 a second opening 9 is obtained, through which the beverage prepared from the initial product P can exit the cavity 6.

The capsule further comprises a covering element 10 fixed to the upper edge 7 of the casing 3 to close hermetically the first opening 8 of the cavity 6. The covering element 10 comprises a film of aluminum or of plastics provided with a barrier layer that is perforable by injection means (which is not shown) by means of which a pressurized liquid, for example water, is injected inside the cavity 6 to produce the beverage.

The covering element 10 is fixed to the upper edge 7 of the casing 3 by heat or ultrasound welding or gluing. Preferably, the covering element 10 is fixed to the casing 3 by heat welding.

The second opening 9, which is preferably of circular shape, in the base wall 4 is also closed hermetically by a closing element 11, which is similar to the covering element 10. A peripheral zone 11a of the closing element 11 is fixed to the second shoulder 4b of the base wall 4, inside the cavity 6, by heat or ultrasound welding or by gluing.

The covering element 10 and the closing element 11 close hermetically the cavity 6 and preserve the initial product P contained therein.

The closing element 11 is intended to tear when, following the delivery of pressurized liquid into the cavity 6, the pressure inside the cavity 6 exceeds a preset value, depending on the mechanical resistance of the closing element of which the closing element 11 is made. The tearing of the closing element 11 determines the exit of the beverage from the cavity 6 and the subsequent dispensing thereof into a container intended to receive the beverage, for example a cup or a beaker.

In the lower part of the cavity 6 a first filtering element 20 is arranged, which is for example made of paper, which is fixed, for example by gluing, on the first shoulder 4a of the base wall 4. A second filtering element can be provided, which is not shown, which is similar to the second filtering element 21 disclosed above, arranged in the same position of the second filtering element 21. The first filtering element 20 and the possible second filtering element 21 prevent the particles of product P being able to be dispensed together with the beverage, when the product P is not a soluble product, such as, for example, coffee powder.

Under the base wall 4, a chamber 12 is defined that can communicate with the cavity 6 through the second opening 9. The chamber 12 is defined by a second portion 13 of side wall and by a bottom wall 14, in the center of which a third opening 15 is made. The chamber 12 has a cross section of preferably circular shape but can also have section that is different from the circular section, for example an elliptical or polygonal or lobed section.

Inside the chamber 12, a damping element 16a is arranged which is a version of the damping element 16 shown in FIGS. 1 to 17.

Similarly to what has been illustrated previously, the function of the damping element 16a is to control the exit speed of the beverage, in particular to prevent the phenomenon of water hammer at the moment of tearing of the closing element 11, preventing pressure waves forming that are generated by the aforesaid phenomenon, which could cause the capsule to explode and also damage the hydraulic circuit of the dispensing machine.

The damping element 16a also performs the function of preventing squirts during dispensing of the beverage into a container.

The damping element 16a comprises a disc-shaped upper part 17, with a preferably rectangular cross section, dimensioned in such a manner that between an outer edge 18 thereof and the second portion 13 of side wall there is defined a first passage 19 (FIG. 26) having sufficient width to enable the damping element 16a to slide inside the chamber 12, but such as to slow significantly the speed of the beverage that passes therethrough and generate a significant pressure difference between the inlet and the outlet of the passage 19. Preferably the width of the passage 19 is not greater than 1 mm.

The damping element 16a further comprises a lower part 22, which is also disc-shaped, with a preferably rectangular cross section on an outer edge 23 of which second passages 39 are obtained in the form of recesses of said outer edge 23 that are so dimensioned as to permit the passage of the beverage without generating significant load losses. In the embodiment illustrated in FIGS. 18 to 26, the openings 39 are four in number, distributed regularly along the outer edge 23 of the lower part 22. Nevertheless, the openings can be fewer or more in number than four and be arranged along the outer edge 23, without falling outside the scope of the present invention.

The upper part 17 and the lower part 22 of the damping element 16a are connected together by first connecting elements 40, 41 comprising a central connecting element 40 in the shape of a column arranged substantially along a diameter of the upper part 17 and of the lower part 22, and by two lateral connecting elements 41, which also have the shape of columns or ribs, parallel to the first connecting element 40 and arranged on sides opposite the first connecting element 40. The upper part 17 and the lower part 22 are further connected together by a third connecting element 44, that intersects the first connecting elements 40, 41, for example it is substantially perpendicular to the first connecting elements 40, 41. The first connecting element 40, the further connecting elements 41 and the third connecting element 44 preferably have a length that is less than the diameter of the upper part 17 and of the lower part 22 of the damping element 16a, such as to enable the beverage to circulate freely between said upper part 17 and said lower part 22.

Between the upper part 17 and the lower part 22 of the damping element 16a a space 42 is defined into which the beverage flows that passes through the first passage 19, before entering the second passages 39.

The damping element 16a lastly comprises a dispensing element 26 through which the beverage is dispensed that is prepared with the product P contained in the cavity 6 of the capsule 1.

The dispensing element 26 is fixed below the lower part 22 by second connecting elements 27, which also, for example, have the shape of columns.

The dispensing element 26 comprises a hollow cylindrical body 28, provided above with an annular edge 29 protruding outside the hollow cylindrical body 28.

The hollow cylindrical body 28 is provided with an inlet opening 32 through which the beverage can enter therein and with an outlet opening 33 through which the beverage can exit the capsule 1. The hollow cylindrical body 28 is inserted into the third opening 15 in the center of the bottom wall 14 of the capsule 1.

The outer diameter of the hollow cylindrical body 28 is chosen in such a manner that the hollow cylindrical body 28 can couple with slight interference with the third opening 15, in such a manner that a seal is assured against leaking of liquid between the hollow cylindrical body 28 and the bottom wall 14 of the capsule 1, but the hollow cylindrical body 28 is not prevented from sliding into the third opening 15 if a thrust is applied to the damping element 16a that is sufficient to overcome the friction resistance between the hollow cylindrical body 28 and the bottom wall 14.

Inside the hollow cylindrical body 28 a baffle 43 is arranged, having a width L (FIG. 24) that is equal to about the internal radius r (FIG. 19) of the hollow cylindrical body 28 and extending for about the entire length of the hollow cylindrical body 28. The baffle 43 reduces substantially the turbulence of the beverage exiting the capsule 1d, such as to avoid squirts whilst the beverage is dispensed into a suitable container.

The operation of the capsule 1d according to the fifth embodiment illustrated in FIGS. 18 to 26 is identical to the operation of the other embodiments of a capsule according to the invention disclosed in FIGS. 1 to 17.

The invention claimed is:

1. A capsule for preparing a beverage, comprising a capsule body made by forming a sheet of thermoformable plastic material, said capsule body comprising:
   a base wall and a first portion of side wall defining a cavity that is suitable for containing an initial product to be combined with a fluid to obtain a final product in the form of a beverage,
   a first opening of said cavity opposite said base wall,
   an upper edge extending from said first portion of side wall and surrounding said first opening,
   a second opening of said cavity made in said base wall,
   wherein said first opening is closed hermetically by a covering element fixed to said edge, wherein said second opening is closed hermetically by a closing element that is suitable for tearing when pressure inside said cavity exceeds a preset value, said capsule further including a chamber located opposite the base wall with respect to the cavity and defined by a second portion of side wall and by a bottom wall of the body of the capsule, said chamber being able to communicate with the cavity through the second opening, when the closing element tears, said chamber being provided with a third opening, made in the center of the bottom wall, inside said chamber there being arranged a damping element for controlling the exit speed of the beverage, wherein said damping element is configured in such a way as to move inside said chamber between an initial position and a final position, through the effect of the pressure of said beverage in said chamber, wherein said damping element includes an upper part and a lower part that are connected together by first connecting elements and a dispensing element connected to said lower part by second connecting elements.

2. The capsule according to claim 1, wherein between the second portion of side wall and an outer edge of the upper part of the damping element a first passage is defined for said beverage, said first passage having a width that is not greater than 1 mm.

3. The capsule according to claim 2, wherein between the second portion of side wall and an outer edge of the lower part of the damping element a second passage is defined for said beverage, having a width that is greater than the width of the first passage.

4. The capsule according to claim 1, wherein the dispensing element includes a hollow cylindrical body, provided above with an annular edge protruding outside the hollow cylindrical body, the hollow cylindrical body being provided with an inlet opening through which the beverage can enter therein, and with an outlet opening through which the beverage can exit the capsule, the cylindrical body being inserted into the third opening.

5. The capsule according to claim 4, wherein an outer diameter of the hollow cylindrical body is chosen in such a way that the hollow cylindrical body is coupled with slight interference with the third opening.

6. The capsule according to claim 4, wherein the lower part of the damping element is provided below with an elongated protrusion that extends inside the hollow cylindrical body.

7. The capsule according to claim 1, wherein said base wall is provided with a first shoulder and with a second shoulder.

8. The capsule according to claim 7, wherein a peripheral zone of the closing element is fixed to the second shoulder of the base wall inside the cavity, by means of a first weld and a central zone of the closing element is fixed by means of a second weld to the upper part of the damping element, between the peripheral zone and the central zone of the closing element there being defined an annular zone devoid of welds, intended to tear when the damping element moves from said initial position to said final position.

9. The capsule according to claim 8, wherein said second weld is made on the entire surface of the central zone of the closing element.

10. The capsule according to claim 8, wherein said second weld is a spot weld.

11. The capsule according to claim 8, wherein said second weld includes a plurality of substantially radial welds.

12. The capsule according to claim 7, wherein in the lower part of the cavity a first filtering element is arranged that is fixed to the first shoulder of the base wall.

13. The capsule according to claim 12, wherein in the lower part of the cavity a second filtering element is arranged that rests on the second shoulder of the base wall.

14. The capsule according to claim 12, wherein the first filtering element is made of paper.

15. The capsule according to claim 13, wherein the second filtering element is made of a nonwoven fabric.

16. The capsule according to claim 8, wherein said first weld and said second weld are heat welds.

17. The capsule according to claim 8, wherein said first weld is an ultrasonic weld and said second weld is a heat weld.

18. The capsule according to claim 1, wherein said first connecting elements of the damping element include a central connecting element arranged substantially along a diameter of the upper part and of the lower part of the damping element by two lateral connecting elements, parallel to the first connecting element and arranged on opposite sides to the first connecting element.

19. The capsule according to claim 1, wherein said upper part and said lower part are further connected together by a third connecting element, which intersects said first connecting elements.

20. The capsule according to claim 2, wherein on an outer edge of the lower part of the damping element at least one second passage for said beverage is obtained.

21. The capsule according to claim 20, wherein said at least one second passage includes a plurality of passages arranged regularly along the outer edge of the lower part.

22. The capsule according to claim 4, wherein inside the hollow cylindrical body a baffle is arranged having a width that is equal to about an internal radius of the hollow cylindrical body and extending for about the entire length of the hollow cylindrical body.

23. The capsule according to claim 1, wherein in the upper part of the damping element, in a substantially central position, a through hole is provided.

24. The capsule according to claim 1, wherein the second portion of side wall has a lobed plan shape with a plurality of portions protruding outwards, at said protruding portions, the first passage and the second passage having respective widenings.

25. The capsule according to claim 1, wherein in the lower part of the cavity a single filtering element is arranged in which a plurality of through holes is made, the dimensions of which are chosen in such a manner as to permit the passage of the beverage but prevent the passage of solid particles.

* * * * *